United States Patent [19]
Bost et al.

[11] 3,870,729
[45] Mar. 11, 1975

[54] PROCESS FOR THE EPOXIDATION OF OLEFINES

[75] Inventors: Pierre-Etienne Bost, Paris; Michel Costantini, Lyon; Guy Lartigau, Tassin-La-Demi Lune, Rhone, all of France

[73] Assignee: Rhone-Poulenc S.A., Paris, France

[22] Filed: Jan. 31, 1974

[21] Appl. No.: 438,461

[30] Foreign Application Priority Data
Feb. 2, 1973 France .............................. 73.03729

[52] U.S. Cl. .......................................... 260/348.5 L
[51] Int. Cl. ............................................. C07d 1/08
[58] Field of Search ............................ 260/348.5 L Primary Examiner—Norma S. Milestone
Attorney, Agent, or Firm—Cushman, Darby & Cushman

[57] ABSTRACT

Olefinic compounds are epoxidized by contact with a hydroperoxide in the presence of a soluble titanium compound and a phosphoric acid ester, which results in an improved yield.

15 Claims, No Drawings

PROCESS FOR THE EPOXIDATION OF OLEFINES

The present invention relates to the epoxidation of olefinic compounds with hydroperoxides.

It is known (U.S. Pat. No. 3,351,635) to epoxidise olefinic compounds with hydroperoxides in the presence of catalysts which are soluble derivatives of metals, especially transition metals and in particular titanium.

The present invention provides an improved form of this known process which gives improved yields.

The process of this invention for the epoxidation of an olefinic compound comprises contacting the said compound with an organic hydroperoxide, in the presence of a soluble titanium compound, and a phosphoric acid ester. As the phosphoric acid ester, a phosphate of the formula:

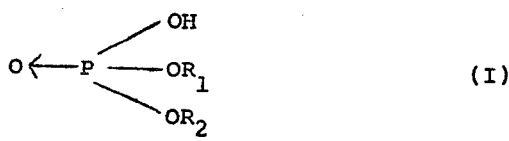

is preferably used, wherein $R_1$ and $R_2$ are unsubstituted or substituted hydrocarbon radicals having in all at least 2 carbon atoms, and $R_1$ can also be hydrogen. Preferably, $R_1$ and $R_2$ have in all from 6 to 24 carbon atoms.

The olefinic compounds which can be epoxidised in accordance with the invention include in particular aliphatic or alicyclic olefines which are unsubstituted or substituted by substituents containing ester, alcohol, ketone or ether groups.

The preferred olefinic compounds have approximately 2 to 30 carbon atoms, and more specifically at least 3 carbon atoms. Examples of olefinic compounds which can be epoxidised according to the invention are ethylene, propylene, n-butenes, isobutene, pentenes, methylpentenes, n-hexenes, octenes, dodecenes, cyclohexene, methylcyclohexenes, butadiene, sytrene, α-methylstyrene, vinyltoluenes, vinylcyclohexenes, and phenylcyclohexenes. Examples of olefinic compounds carrying substitutents containing ester, alcohol, ketone or ether groups are allyl alcohol, methallyl alcohol, cyclohexenols, diallyl ether, methyl methacrylate, methyl oleate, and allyl chloride. Olefinic compounds containing more than 30 carbon atoms and especially macromolecular olefinic compounds can also be used, especially polybutadiene and polyisoprene.

The hydroperoxides which are used as epoxidising agent have the formula ROOH, R being an organic radical, the free valency of which is carried by a carbon atom; preferably, R is an alkyl, cycloalkyl, aralkyl, aralkenyl, hydroxyaralkyl, cycloalkenyl or hydroxycycloalkyl radical, the number of carbon atoms in R being preferably from 3 to 30.

Suitable hydroperoxides are cumyl hydroperoxide, tertiary butyl hydroperoxide, cyclohexyl hydroperoxide, benzyl hydroperoxide and cyclohexenyl hydroperoxide, as well as the hydroperoxides derived from ethylbenzene, cyclohexanone, tetralin, methyl ethyl ketone, methylcyclohexene, toluene, para-ethyltoluene, isobutylbenzene, diisopropylbenzene, para-isopropyltoluene, (o-, m- and p-)xylenes, and phenylcyclohexane. The preferred hydroperoxide is cyclohexyl hydroperoxide.

As indicated above, the catalyst used in this invention is a soluble titanium compound. By soluble catalyst is meant a catalyst which is soluble in the initial reaction medium to extent extend of at least 0.01% by weight and preferably at least 1% by weight. When the olefinic compound treated is liquid and is the main constituent of the reaction medium, it is in this olefinic compound that the catalyst must be soluble.

The titanium compound used as catalyst may be an organometallic compound, more particularly titanium naphthenate, titanium stearate, titanium octoate or titanium carbonyl; a chelate, especially titanium acetylacetonate or titanyl acetylacetonate; or a titanium ester such as a tetraalkyl titanate especially one in which each alkyl radical contains 1 to 18 carbon atoms.

In the formula (I) of the preferred phosphoric acid esters used in the invention, the symbols $R_1$ and $R_2$ can represent, for example (subject to the requirement that they also fulfil the condition already indicated as to the total number of carbon atoms) an alkyl radical such as methyl, butyl, heptyl, octyl, dodecyl and octadecyl, a cycloalkyl radical, such as cyclohexyl, cyclododecyl and menthyl, an aryl radical such as tolyl, or an aralkyl radical such as phenylethyl. Specific suitable phosphates are mono-or di-(n-butyl) orthophosphate, mono- or di-(n-heptyl) orthophosphate, mono- or di-(2-ethyl-hexyl) orthophosphate, mono- or di-(n-dodecyl) orthophosphate, mono-or di-(n-octadecyl) orthophosphate, monomethyl monobenzyl orthophosphate, monoethyl monotolyl orthophosphate, monomenthyl orthophosphate, and mono-(n-dodecyl) monocyclohexyl orthophosphate. It is possible to use one phosphate or a mixture of phosphates, of the formula (I).

Other additives or adjuvants can of course also be added to the reaction medium, and especially basic compounds, compounds of metals from sub-groups 7 and 8 of the periodic classification, tertiary alcohols such as tertiary butanol, and primary or secondary alcohols.

The epoxidation temperature can be between $-20°$ and $+200°C$, but is generally between $0°$ and $150°C$, and preferably between $40°$ and $130°C$. The temperature and pressure conditions are chosen so that the reaction takes place essentially in the liquid phase. Pressures between atmospheric pressure and 70 bars are generally employed.

Finally, the reaction medium can optionally contain a solvent. This solvent is especially useful when the olefinic compound to be epoxidised is normally gaseous under the chosen pressure and temperature conditions. The solvent is preferably miscible in all proportions with the olefinic compound to be epoxidised. Suitable solvents include organic liquids such as the saturated compounds corresponding to the olefinic compound to be epoxidised, and especially saturated or aromatic hydrocarbons which are liquid under the reaction conditions. Examples of such solvents are cyclohexane, benzene and acetonitrile.

The molar ratio of olefinic compound to hydroperoxide is generally 0.5/1 to 100/1, and preferably 2/1 to 10/1.

The concentration of hydroperoxide in the reaction medium is generally 0.1 to 50% by weight, and preferably 0.5 to 30%. Of course, these concentrations and other reaction conditions are chosen so as to avoid any risks of explosions; these risks are inherent in the use of peroxides, and are well understood in the art.

The amount of soluble catalyst is generally 0.001 to 10% by weight of the reaction medium, and preferably 0.1 to 1%.

The amount of phosphate of the formula (I) is generally such that the ratio of the number of P atoms to Ti atoms in the reaction medium is 0.01 to 10, and preferably 0.1 to 2.

The epoxidation can be carried out continuously or discontinuously.

At the end of the reaction, the isolation of the epoxide formed from the reaction medium is effected by any known means, especially by distillation.

The process of the invention makes it possible to avoid total or partial precipitation of the titanium based catalyst, during the reaction, by conversion of this catalyst into insoluble forms. The reaction medium thus remains homogeneous.

The following Examples illustrate the invention.

EXAMPLES 1 to 12

A series of experiments involving the epoxidation of olefines with cyclohexyl hydroperoxide (abbreviated to: CHHPO) is carried out in accordance with the following general procedure:

0.02 mol of CHHPO, a liquid olefine, tertiary butanol or some other solvent, octyl phosphate (a mixture of (2-ethylhexyl) monophosphate and (2-ethyl-hexyl) diphosphate in respective molar proportions of 80/20), and n-butyl titanate $(Ti(O-C_4H_9)_4$ are introduced into a 100 $cm^3$ flask which is under an inert atmosphere and surmounted by a reflux condenser. The mixture is heated at a temperature T°C for a period $t$. At the end of the reaction, the epoxide formed as well as the CHHPO remaining are measured.

The particular conditions for each example and the results obtained are given in Tables (I) and (II). The yield of epoxide is a yield calculated relative to the CHHPO which reacted. The comparison examples 1bis and 5bis show, compared with Examples 1 and 5, the effect of the presence of phosphate.

EXAMPLES 13 to 17

A series of experiments involving the epoxidation of styrene with CHHPO is carried out in accordance with the following general procedure:

The hydroperoxide, cyclohexane, styrene, octyl phosphate (as in Example 1), tertiary butanol, and n-butyl titanate are introduced into a 1 l flask which is under an inert atmosphere and is surmounted by a reflux condenser. The mixture is then heated to the reflux temperature, and at the end of the reaction, the epoxide formed as well as the hydroperoxide remaining are measured.

The particular conditions for each example and the results obtained are given in Table (II). The yields are calculated relative to the hydroperoxide which reacted. BHPO denotes benzyl hydroperoxide. CHPO denotes cumyl hydroperoxide. The comparison experiment 17bis shows the effect of the presence of phosphate.

TABLE (I)

| EXAMPLE | Olefine Nature | Olefine Quantity in mols | Number of mols of Titanate | Number of mols of Phosphate | Solvent or tertiary butanol Nature | Solvent or tertiary butanol Quantity in g | Duration t in hours | Temperature T in °C | Degree of conversion in % | Yield of epoxide (in %) |
|---|---|---|---|---|---|---|---|---|---|---|
| 1 | n-hex-1-ene | 0.25 | $4\times10^{-4}$ | $4\times10^{-4}$ | t-butanol | 3.6 | 24 | 63 | 95 | 70 |
| 1 bis (comparison) | n-hex-1-ene | 0.25 | $4\times10^{-4}$ | 0 | t-butanol | 3.6 | 24 | 63 | 97.5 | 53 |
| 2 | n-oct-1-ene | 0.2 | $4\times10^{-4}$ | $4\times10^{-4}$ | t-butanol | 3.6 | 24 | 70 | 89 | 64.4 |
| 3 | n-oct-1-ene | 0.2 | $4\times10^{-4}$ | $4\times10^{-4}$ | None | 0 | 24 | 70 | 96.5 | 52 |
| 4 | n-oct-1-ene | 0.2 | $4\times10^{-4}$ | $4\times10^{-4}$ | t-butanol | 3.6 | 12 | 125 | 99.5 | 32.7 |
| 5 | n-oct-1-ene | 0.2 | $2.2\times10^{-4}$ | $2.2\times10^{-4}$ | t-butanol | 3.6 | 24 | 85 | 98.5 | 51.4 |
| 5 bis (comparison) | n-oct-1-ene | 0.2 | $2.2\times10^{-4}$ | 0 | t-butanol | 3.6 | 24 | 85 | 95 | 37 |
| 6 | n-oct-1-ene | 0.2 | $2\times10^{-4}$ | $2\times10^{-4}$ | t-butanol | 3.6 | 24 | 65 | 70 | 78.5 |
| 7 | n-oct-1-ene | 0.2 | $2\times10^{-4}$ | $2\times10^{-4}$ | t-butanol | 3.6 | 24 | 75 | 98.5 | 58 |
| 8 | n-oct-1-ene | 0.2 | $10^{-4}$ | $10^{-4}$ | t-butanol | 3.6 | 24 | 75 | 98 | 53 |
| 9 | n-oct-1-ene | 0.2 | $4\times10^{-4}$ | $4\times10^{-4}$ | t-butanol | 11.5 | 24 | 75 | 94.3 | 67.7 |
| 10 | cyclohexene | 0.2 | $4\times10^{-4}$ | $4\times10^{-4}$ | t-butanol cyclohexane | 3.6 / 66 | 5 | 75 | 99 | 87 |
| 11 | cyclohexene | 0.2 | $4\times10^{-4}$ | $4\times10^{-4}$ | t-butanol | 3.6 | 24 | 75 | 100 | 75 |
| 12 | n-hex-1-ene | 0.3 | $4\times10^{-4}$ | $4\times10^{-4}$ | benzene | 26 | 24 | 63 | 90 | 51 |

TABLE (II)

| EXAMPLE | Nature of the hydroperoxide | Hydroperoxide (mols) | Styrene (mols) | Titanate (mols) | Phosphate (mols) | t. Butanol (g) | Solvent (g) | Duration in hours | Temperature in °C | Degree of conversion in % | Yield of epoxide in % |
|---|---|---|---|---|---|---|---|---|---|---|---|
| 13 | HHPO | 0.1 | 1 | $2\times10^{-3}$ | $2\times10^{-3}$ | 18 | 416 | 3 | 82 | 99 | 80 |

TABLE (II) – Continued

| EXAMPLE | Nature of the hydroperoxide | Quantities of reagents or diverse additives | | | | | | Duration in hours | Temperature in °C | Degree of conversion in % | Yield of epoxide in % |
|---|---|---|---|---|---|---|---|---|---|---|---|
| | | in mols | | | | in g | | | | | |
| | | Hydroperoxide | Styrene | Titanate | Phosphate | t. Butanol | Solvent | | | | |
| 14 | HHPO | 0.1 | 0.3 | $2\times10^{-3}$ | $2\times10^{-3}$ | 17.4 | (cyclohexane) 156 | 3 | 82 | 96 | 70 |
| 15 | BHPO | 0.05 | 0.5 | $10^{-3}$ | $10^{-3}$ | 9 | (cyclohexane) 208.3 | 3 | 83 | 92.2 | 65 |
| 16 | CHPO | 0.1 | 0.3 | $2\times10^{-3}$ | $2\times10^{-3}$ | 18 | (benzene) 177 | 5.5 | 81 | 56.7 | 72 |
| 17 | CHHPO | 0.1 | 1 | $2\times10^{-3}$ | $2\times10^{-3}$ | 18 | (cyclohexane) 416 | 7 | 50 | 98.5 | 78 |
| 17 bis (comparison) | CHHPO | 0.1 | 1 | $2\times10^{-3}$ | 0 | 18 | 416 | 7 | 50 | 99.5 | 67.6 |

EXAMPLE 18

Example 3 is repeated with the following changes: Cyclohexyl hydroperoxide is replaced by cumyl hydroperoxide. The duration of the reaction is 50 hours instead of 24. The temperature is 81° instead of 70°C.

The epoxide is obtained in a yield of 54.5%, the degree of conversion of the hydroperoxide being 86%.

EXAMPLE 19

Example 1 is repeated with the following changes: The catalyst is titanyl acetylacetonate $(C_5H_7O_2)_2TiO$. The temperature is 63°C (boiling under reflux) instead of 75°C.

The epoxide is obtained in a yeild of 55%, the degree of conversion of the hydroperoxide being 95.5%.

EXAMPLE 20

0.02 mol of cyclohexyl hydroperoxide, 90 g of cyclohexane, 7.2 g of tertiary butanol, 0.14 g of n-butyl titanate, and 0.1 g of the octyl phosphate used in Example 1 are introduced into a 150 cm³ stainless steel autoclave. 20 g of propylene are introduced and the pressure is then raised to 15 bars (at 25°C) with nitrogen. The mixture is heated at 75°C for 24 hours.

After cooling, the gas inside the apparatus is released by allowing the gaseous effluents to bubble successively through 2 wash flasks each containing 100 cm³ of cyclohexane cooled to 5°C. The contents of these wash flasks are combined with the reaction medium. The propylene oxide in the mixture as well as the CHHPO remaining are measured. The degree of conversion is 63%, and the yield of epoxide is 60%.

EXAMPLE 20 bis (comparison)

Example 20 is repeated, but without the phosphate. The degree of conversion is 81%, and the yield of epoxide is 44%.

WE CLAIM:

1. In a process for the epoxidation of an olefinic compound by contacting the said compound with an organic hydroperoxide in the presence of a soluble titanium compound, the improvement which consists in carrying out the said epoxidation in the presence of a phosphoric acid ester.

2. The improvement of claim 1, in which the phosphoric acid ester is a phosphate of the formula:

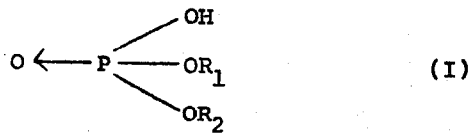

(I)

wherein $R_1$ and $R_2$ are unsubstituted or substituted hydrocarbon radicals having in all at least 2 carbon atoms, and $R_1$ can also be hydrogen.

3. The improvement of claim 2, in which $R_1$ and $R_2$ each represent alkyl, cycloalkyl, aryl, or aralkyl.

4. The improvement of claim 3, in which $R_1$ and $R_2$ each represent methyl, butyl, heptyl, octyl, dodecyl, octadecyl, cyclohexyl, cyclodecyl, menthyl, tolyl, or phenylethyl.

5. The improvement of claim 2, in which the phosphate of the formula (I) is mono- or di-(-n-butyl) orthophosphate, mono- or di-(n-heptyl) orthophosphate, mono- or di-(2-ethyl-hexyl) orthophosphate, mono- or di-(n-dodecyl) orthophosphate, mono- or di-(n-octadecyl) orthophosphate, monomethyl monobenzyl orthophosphate, monoethyl monotolyl orthophosphate, monomenthyl orthophosphate, mono-(n-dodecyl) monocyclohexyl orthophosphate, or a mixture of two or more of these.

6. The improvement of claim 1, in which the olefinic compound is an aliphatic or alicylic olefine of 3 to 30 carbon atoms which is unsubstituted or substituted by substituents containing ester, alcohol, ketone or ether groups.

7. The improvement of claim 1, in which the olefine is ethylene, propylene, an n-butene, isobutene, a pentene, a methylpentene, an n-hexane, an octene, a dodecene, cyclohexene, a methylcyclohexene, butadiene, styrene, α-methylstyrene, a vinyltoluene, a vinylcyclohexene, a phenylcyclohexene, allyl alcohol, methallyl alcohol, a cyclohexenol, diallyl ether, methyl methacrylate, methyl oleate, allyl chloride, polybutadiene, or polyisoprene.

8. The improvement of claim 1, in which the hydroperoxide has the formula ROOH, where R is an alkyl, cycloalkyl, aralkyl, aralkenyl, hydroxyaralkyl, cycloalkenyl, or hydroxycycloalkyl radical, the number of carbon atoms in R being from 3 to 30.

9. The improvement of claim 8, in which the hydroperoxide is cyclohexyl hydroperoxide, benzyl hydroperoxide or cumyl hydroperoxide.

10. The improvement of claim 1, in which the titanium compound is titanium naphthenate, titanium stearate, titanium octoate, titanium carbonyl, titanium acetylacetonate, titanyl acetylacetonate, or a tetraalkyl titanate, in which each alkyl radical contains 1 to 18 carbon atoms.

11. The improvement of claim 1, in which the reaction temperature is 40° to 130°C.

12. The improvement of claim 1, in which the molar ratio of the olefinic compound to the hydroperoxide is 0.5/1 to 100/1.

13. The improvement of claim 1, in which the concentration of hydroperoxide in the reaction medium is 0.1 to 50% by weight.

14. The improvement of claim 1, in which the amount of the said soluble titanium compound is 0.001 to 10% by weight of the reaction medium.

15. The improvement of claim 1, in which the amount of phosphate of the formula (I) is such that the ratio of the number of P atoms to Ti atoms in the reaction medium is 0.01 to 10.

* * * * *